March 6, 1956 — L. T. SZADY — 2,737,275
SPRAG ASSEMBLY FOR ONE-WAY CLUTCHES
Filed Feb. 24, 1953 — 2 Sheets-Sheet 1

INVENTOR.
LEOPOLD T. SZADY
BY
Whittemore Hulbert & Belknap
ATTORNEYS

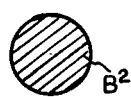
FIG. 7.  FIG. 8.  FIG. 9.
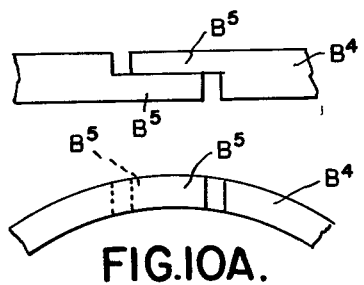
FIG. 10.
FIG. 10A.
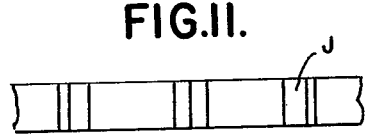
FIG. 11.
FIG. 11A.
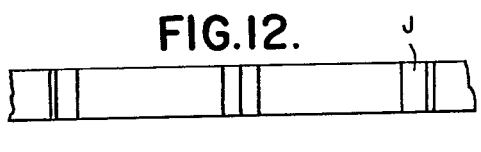
FIG. 12.
FIG. 12A.
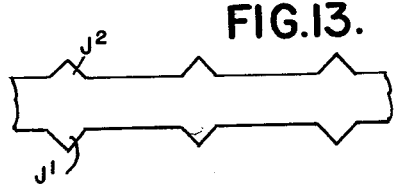
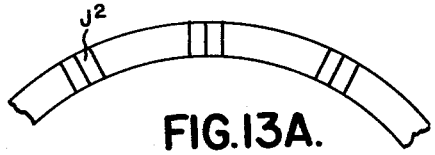
FIG. 13.
FIG. 13A.
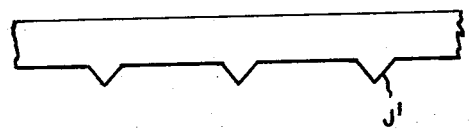
FIG. 14.
FIG. 14A.
*INVENTOR.*
LEOPOLD T. SZADY
BY
ATTORNEYS

United States Patent Office 2,737,275
Patented Mar. 6, 1956

2,737,275

SPRAG ASSEMBLY FOR ONE-WAY CLUTCHES

Leopold T. Szady, Hamtramck, Mich., assignor to Formsprag Company, Van Dyke, Mich., a corporation of Michigan Application February 24, 1953, Serial No. 338,408

4 Claims. (Cl. 192—45.1)

The invention relates to one-way clutches of that type in which a complement of sprags is placed between concentric raceways on coaxial relatively rotatable members. Sprags for this purpose are formed from prismatic bodies having radially opposite eccentric cam faces which frictionally engage the raceways upon rotation of the sprag in one direction and are released by rotation in the opposite direction. However, in the assembly of the clutch all of the sprags must be similarly arranged as otherwise the clutch would be inoperative. Due to the fact that the eccentricity of the cam faces is not very apparent, a misplaced sprag as for instance, one reversed from end to end, might easily be undetected in the assembly.

It is the object of the invention to obtain a sprag assembly which may be inserted as a unit between the race members and in which all of the sprags are similarly arranged with freedom for individual limited rotation.

It is a further object to obtain an assembly including the energizing means by which each sprag will be biased to frictionally contact with the raceways.

The invention therefore consists first, in a sprag assembly including a ring which is insertable in the space between the concentric raceways and a complement of sprags mounted on said ring to be held with their individual axes parallel to the axis of the ring.

The invention further consists in a construction in which each sprag has a transverse channel therein perpendicular to its axis of rotation for engaging the ring whereby the axes of all of the sprags are held in parallelism.

The invention further consists in a construction in which the ring engaging channel is in the face of the sprag which frictionally engages one of the raceways, each sprag being also provided with a second channel in its opposite face and a garter spring engaging said second channel for retaining engagement between the sprags and the ring.

The invention further consists in the construction in which said garter spring also constitutes the energizing means for the individual sprags.

The invention further consists in the more specific construction as hereinafter set forth.

In the drawings:

Figs. 7, 8 and 9 illustrate alternative cross-sectional contours of the assembly ring;

Figs. 10 and 10A are respectively an edge elevation and side elevation of an expansible and retractable ring such as used in Fig. 6;

Figs. 11, 11A, 12, 12A, 13, 13A, 14 and 14A are respectively edge elevations and side elevations of modified construction of assembly ring.

A is the sprag assembly which comprises a ring B insertable between the spaced concentric raceways of a one-way clutch and a full complement of sprags C mounted on this ring with freedom for limited rotation about their individual axes. To permit of thus mounting the sprags on the ring, each sprag is provided with a transverse channel D in one of its cam faces which is perpendicular to the axis of rotation of the sprag. This channel is of a width corresponding to the width of the ring B so that when the sprags are mounted on the ring their axes will be held in parallel relation to each other without interference with individual rotation about said axes. To retain the sprags in such engagement a second transverse channel E is formed in the radially opposite face of each sprag and a resilient garter spring F, engaging said channels E, holds the sprags upon the ring D. The garter spring F may also constitute the energizing means for biasing the sprags to frictionally engage the raceways and to this end the bottoms E' of the channels E are inclined so that the spring bears on only one end thereof. It is obvious that the assembly A forms a unit which as such may be inserted between the concentric raceways G and H of a one-way clutch and may also be withdrawn therefrom at any time. This insures that all of the sprags will be properly positioned in relation to each other and the raceways of the clutch as the elements of the unit may be assembled at the manufacturing plant and need not be disturbed thereafter. It is a fact that a one-way clutch may be rendered inoperative by improper assembly of the sprags as, for instance, by reversing one or more end for end.

Figure 3:
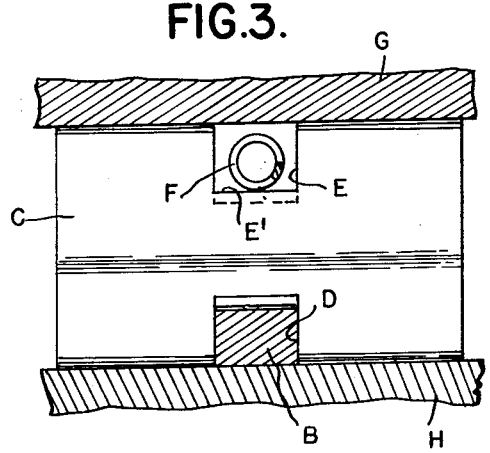
Fig. 3 is a cross-section of Fig. 2.

As shown in Fig. 3 the ring B is of oblong rectangular cross-section but this is not essential as this cross-sectional contour may be varied without alteration of its function. It is only necessary that the width of the ring should be the same as the width of the channel D but the contour may be oblong rectangular, as in Figs. 3 and 9, or square as at B', Fig. 8, or circular as at $B^2$, Fig. 7. Furthermore, it is not essential that the ring should be of a solid cross-section as it may be formed of a helix, as illustrated at $B^3$, Figs. 4 and 5. With each of these modifications the ring will bear against the parallel sides of the channel D and as this channel is perpendicular to the axis of the sprag the ring will hold the axes of all in parallelism.

Figure 1:
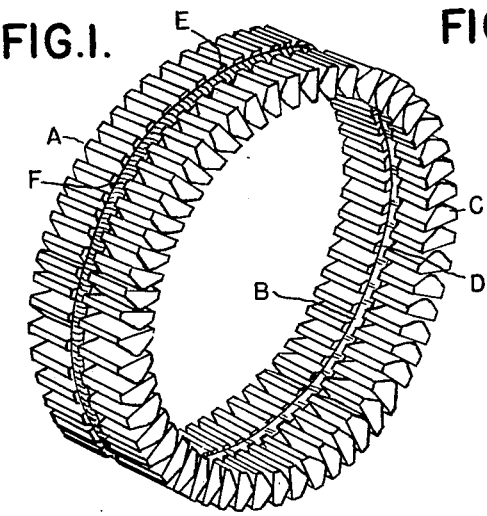
Fig. 1 is a perspective view of the sprag assembly.
Figure 2:
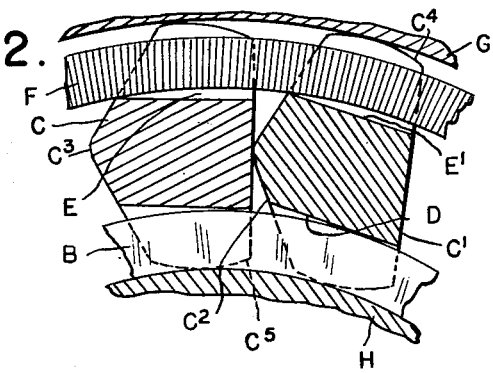
Fig. 2 is an enlarged section through a portion of the assembly in the plane of the ring.
Figure 6:
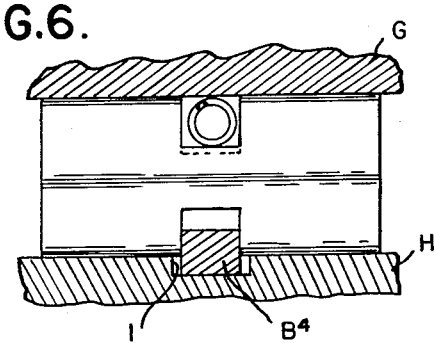
Fig. 6 is a view similar to Fig. 2 showing another modification.

It is sometimes advantageous to hold the sprags against endwise movement in relation to the raceways. This may be accomplished by the construction shown in Figs. 6, 10 and 10A where the ring instead of being continuous has a joint at one point in its circumference permitting of expanding or contracting the diameter. In Fig. 6 the ring $B^4$ is shown as engaging an annular channel I in the inner raceway H. To permit of such engagement the ring must first be expanded in diameter to pass over the larger diameter of the working face of the raceway and must also be resilient so as to contract to its original diameter when engaged with the channel I. This also necessitates the splitting of the ring and, as shown in Figs. 10 and 10A, the split is formed to have overlapping portions $B^5$. These prevent any interruption in the continuity of the ring even if it does not fully contract to its original diameter. Such overlap may not be necessary and the two ends may merely abut each other. Also the ring when not split may be formed from a strip bent into circular shape with its ends abutting or welded to each other.

Figure 5:
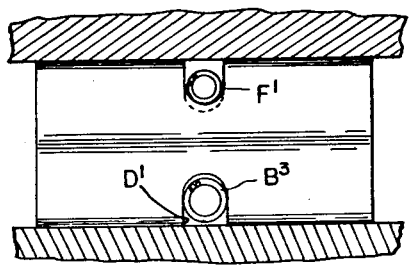
Figs. 4 and 5 are views similar to Figs. 2 and 3 illustrating a modified construction.
Figure 4:
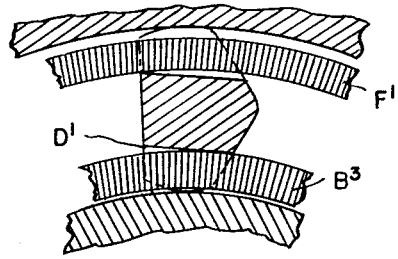

With the construction shown in Figs. 4 and 5, the helix forming the ring $B^3$ may function merely as a holder for the sprags or it may perform the further function of an energizing means. Thus, as shown in Fig. 4, the channel D' for receiving the ring $B^3$ has an inclined bottom so that said ring bears against the right hand end only of said bottom. If the helix is resilient and biased to expand it will turn the sprags towards frictional engagement and at the same time the garter spring F' which is biased to contract bears to the left end of the bottom of the channel E to cooperate in energizing the sprags.

The ring B may also, if so desired, be used as a means for spacing and relatively positioning the sprags about the raceways. This is illustrated in Figs. 11, 11$^A$ to 14, 14$^A$. In Figs. 11 and 11$^A$ outward projections J on the periphery of the ring will form shoulders for locating the sprags. Figures 12 and 12$^A$ show a similar construction with a greater spacing between the projections where a lesser number of sprags is used to form the complement. In Figs. 13 and 13$^A$ projections J' and J$^2$ are formed on opposite sides of the ring. In Figs. 14 and 14$^A$ these projections are on one side only. In each case the shoulders will hold the sprags from becoming misplaced in the raceways.

Any suitable specific construction of sprag may be used in the assembly but as illustrated each sprag is formed with a substantial radially extending side C', a V-shaped opposite side C$^2$ with a rounded nose C$^3$ at its apex and radially opposite cam faces C$^4$ and C$^5$ which are eccentric to each other. Thus where a full complement of sprags is assembled upon the ring B the nose portion C$^3$ will contact with the side C' of an adjacent sprag in the released position of the clutch.

What I claim as my invention is:

1. A sprag assembly for one-way clutches of the type including spaced concentric raceways on relatively rotatable coaxial members for receiving sprags therebetween; said assembly comprising a series of sprags, each having an outer and an inner race engaging cam face with a circumferentially extending channel therein, a ring of a width to fit said channel on which all of said sprags are mounted being formed of resilient material and severed at one point in its circumference to permit of springing into engagement with one of said channels of each sprag, and a resilient annulus completely surrounding said series of sprags engaging the other channel of each sprag and retaining the same on said ring.

2. The construction as in claim 1 in which the ring is fashioned to provide overlapping portions in the ends on opposite sides of the split to maintain continuity in peripheral surface when expanded or controlled in diameter.

3. The construction as in claim 1 in which the ring is formed of a helix.

4. The construction as in claim 3 in which the helix forming the ring is resilient and forms an energizing means for the sprags.

References Cited in the file of this patent
UNITED STATES PATENTS

| | | |
|---|---|---|
| 2,386,013 | Swenson | Oct. 2, 1945 |
| 2,407,772 | Dodge | Sept. 17, 1946 |
| 2,477,176 | Gruenberg et al. | July 26, 1949 |
| 2,570,290 | Turner | Oct. 9, 1951 |
| 2,614,669 | Dodge | Oct. 21, 1952 |